(12) United States Patent
Koiwai (10) Patent No.: US 7,419,438 B2
(45) Date of Patent: Sep. 2, 2008

(54) PUTTER WITH A DISTANCE MEASUREMENT MECHANISM

(76) Inventor: Hideaki Koiwai, 30-11, Shirayuri 3-chome, Izumi-ku, Yokohama-shi, Kanagawa (JP) 245-0005

( * ) Notice: Subject to any disclaimer, the term of this patent is extended or adjusted under 35 U.S.C. 154(b) by 98 days.

(21) Appl. No.: 11/287,616

(22) Filed: Nov. 28, 2005

(65) Prior Publication Data

US 2006/0079342 A1    Apr. 13, 2006

Related U.S. Application Data

(63) Continuation of application No. PCT/JP2004/003501, filed on Mar. 16, 2004.

(30) Foreign Application Priority Data

| May 29, 2003 | (JP) | ............... 2003-003935 U |
| May 29, 2003 | (JP) | ............... 2003-003936 U |
| May 29, 2003 | (JP) | ............... 2003-189860 |
| Sep. 26, 2003 | (JP) | ............... 2003-272163 U |
| Sep. 26, 2003 | (JP) | ............... 2003-272164 U |
| Nov. 5, 2003 | (JP) | ............... 2003-272973 U |
| Dec. 16, 2003 | (JP) | ............... 2003-436545 |

(51) Int. Cl.
*A63B 69/36* (2006.01)

(52) U.S. Cl. ................ 473/226; 473/221

(58) Field of Classification Search ......... 473/219–226, 473/238, 241, 201, 202, 206, 404; 33/262, 33/263, 265, 277

See application file for complete search history.

(56) References Cited

U.S. PATENT DOCUMENTS 2,519,727 A * 8/1950 Yezdan ................. 33/277
3,824,698 A * 7/1974 Brucker ................. 33/277
3,934,353 A * 1/1976 Haines ................. 33/262
4,082,286 A * 4/1978 La Breche ............. 473/241
4,135,720 A * 1/1979 Lancellotti ............ 473/233
4,482,155 A * 11/1984 Higley ................. 473/241

(Continued)

FOREIGN PATENT DOCUMENTS

JP          53-050934 U    10/1979

(Continued)

OTHER PUBLICATIONS

International Search Report, PCT/JP2004/003501 dated May 11, 2004 (2 pages).

(Continued)

*Primary Examiner*—Nini F. Legesse
(74) *Attorney, Agent, or Firm*—Osha Liang LLP (57) ABSTRACT

A putter with a distance measurement mechanism comprises a shaft, a head disposed on an end of the shaft, and a grip disposed on an opposite end of the shaft, wherein the grip comprises a through-hole is formed on an end of the grip, and an indication member having a scale extending from the through-hole toward the shaft. The scale may comprise marks indicating at least one of a distance to a cup and a recommended backswing amount. The player looks at a cup on a green as the player holds the putter, positioning an end of the grip at eye's level, the player reads off the scale of the grip to estimate the distance to the cup and the recommended backswing amount.

12 Claims, 8 Drawing Sheets

U.S. PATENT DOCUMENTS

| | | | | |
|---|---|---|---|---|
| 5,058,891 | A * | 10/1991 | Takeuchi | 473/201 |
| 5,330,179 | A * | 7/1994 | Hampel | 473/404 |
| 5,427,370 | A * | 6/1995 | Hamblin et al. | 473/238 |
| 5,957,782 | A * | 9/1999 | Madara | 473/226 |
| 6,997,283 | B2 * | 2/2006 | Wollenberg et al. | 182/214 |

FOREIGN PATENT DOCUMENTS

| | | |
|---|---|---|
| JP | 3-242161 A | 10/1991 |
| JP | 7-289668 A | 11/1995 |
| JP | 9-313652 A | 12/1997 |
| JP | 2001-286590 A | 10/2001 |

OTHER PUBLICATIONS

Patent Abstract JP3242161 from esp@cenet dated Oct. 29, 1991 (1 page).
Patent Abstract JP9313652 from esp@cenet dated Dec. 9, 1997 (1 page).
Patent Abstract JP7289668 from esp@cenet dated Nov. 7, 1995 (1 page).
Patent Abstract JP2001286590 from esp@cenet dated Oct. 16, 2001 (1 page).
Patent Abstracts of Japan 54-142476 dated Nov. 6, 1979 (1 page) (relates to Ref. BE above).

* cited by examiner

The amount of backswings to a green angle of inclination

PUTTER WITH A DISTANCE MEASUREMENT MECHANISM

CROSS-REFERENCE TO RELATED APPLICATIONS

This is a continuation application of PCT/JP2004/003501 filed on Mar. 16, 2004, the contents of which are incorporated herein by reference.

BACKGROUND OF INVENTION

1. Field of the Invention

The invention relates generally to a putter with a distance measurement mechanism.

2. Background Art

It is important for a player to have a good sense of distance to, at a first putt on the green, putt a ball in a one-putt range generally defined as a one-meter circle from a cup or hole. It is also important to putt the ball within the one-putt range with accuracy. A distance between the ball and the cup has been typically measured by visual measurement. Otherwise, the player may have paced off the distance. The visual measurement may allow a short distance to be accurately estimated. The player, however, would tend to fail to estimate a long distance due to a landscape opened out before the player. The measurement by pacing requires some practice, and thus the distance estimated by pacing is insufficient for common players. In addition, an inclination of the green is an important factor in putting. Thus, it is tough for the player with a few amount of practice to improve the player's skills of measurement because "swing back" motion for putting in accordance with the distance and inclination needs experience.

Japanese Patent Publication No. H7-289668 discloses a method using two laser beams irradiated from two devices disposed on a head of a putter. Specifically, the putter is positioned at the cup, and thereafter a first device of the putter irradiates a ball with a first laser beam in a direction perpendicular to a putting surface of the head. A second device, which is provided with a mechanism for adjusting a rotation angle, rotates such that a second laser beam irradiated from the second device is aligned with the point of the ball irradiated by the first laser beam, outputting the rotating angle. By way of this, the method allows the distance to the object to be calculated. However, the putter is expensive and requires long time during tense play.

Japanese Patent Publication No. H3-242161 discloses a device for measuring a distance between a point on through-the-green and a flagstick or pin. Specifically, a player holds a club away from the player's eyes at a predetermined distance, aligns a reference insignia for measurement disposed on the club with a top of the flagstick, thereby estimating the distance to the flagstick based on a position where an axis of a visual line to the flagstick intersects with the club. Its club head may be contact with a lie to stably hold the club, and the predetermined distance may be obtained by straightening the player's arm. The disclosed method measures the distance to the green, assuming that the length of the flagstick is two meters and the length of the arm is determined to a large extent by standard proportions of players. However, under the rules of golf, the flagstick should be taken out, and thus the method cannot be used on the green.

As mentioned above, the inclination of the green is one of important factors in putting with accuracy. Japanese Patent Publication No. 2001-286590 discloses measuring an inclination angle of the green and a direction to the cup. Specifically, a device disclosed in the publication includes a sphere container and a rolling element accommodated in the sphere container, and the angle can be measured based on a stationary state of the rolling element. However, the device lacks an angle scale on the container to determine degree of the inclination, and thus the device cannot accurately measure the inclination angle of the green.

Further, Japanese Utility Model Publication S53-50934 also discloses a similar device for measuring an inclination angle of the green and a direction to the cup. Specifically, the device includes a rolling element accommodated in a sphere container having an angle scale. The sphere container is filled with high-viscosity liquid. However, due to temperature characteristics of the liquid, error of measurement may occur. In addition, there may be a problem that the liquid leaks out.

As mentioned above, none of the conventional devices and methods can measure the distance to the cup with accuracy and with rapidity in atmosphere of tense play on the green.

SUMMARY OF INVENTION

In view of above, the present invention provides a putter with a mechanism for measuring a distance to a cup on a putting green and an inclination angle of the green, and a putting method using the putter.

In one aspect of the present invention, a putter comprises a shaft, a head disposed on an end of the shaft, and a grip disposed on an opposite end of the shaft, wherein the grip comprises a through-hole is formed on an end of the grip, and an indication member having a scale or gauge extending from the through-hole toward the shaft. The scale may comprise marks indicating at least one of a distance to a cup and a recommended backswing amount.

The present invention may be effective at a first putting on the green. Without empirical knowledge or skills, the present invention provides putting motion based on numerical data. Advantageously, even if the player loses form, analysis of problems can be easily and quickly made. In addition, the player can easily adjust the form on the green.

Other aspects and advantages of the invention will be apparent from the following description and the appended claims.

DETAILED DESCRIPTION

The invention is described below with reference to an exemplary embodiment illustrated in the attached drawings and made in accordance with a corresponding exemplary method.

Figure 1:
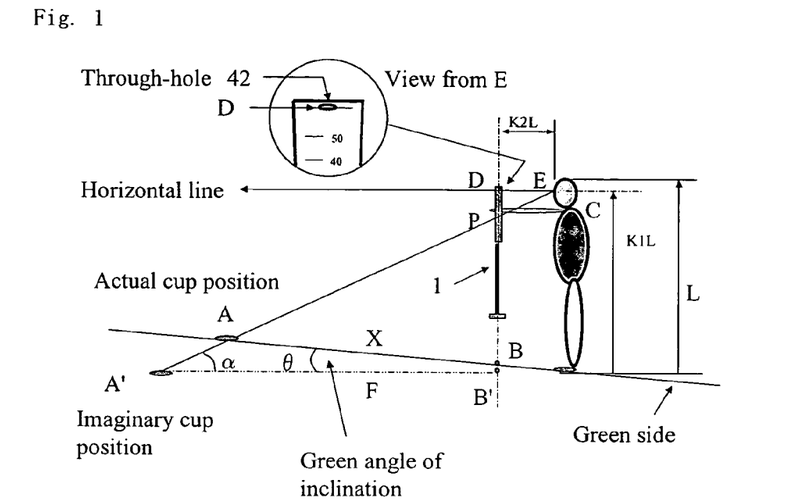
FIG. 1 is a frame format according to one embodiment of the invention.

Referring to FIG. 1, a ball B is on a putting green having an inclination angle θ and off from a cup A at a distance. A player holds a putter 1 vertically just above the ball B with his/her arms straightened horizontally. The center D of a through-hole 42 at a grip end of the putter 1 having a scale 2 is positioned at player's eye level by looking at a horizontal view light through the hole, and then the player looks at the cup A. Based on its visual line and an intersection point P, a right triangle PDE has a scaling relationship with a triangle PB'A'. Thus, the distance to the cup A can be calculated based on the length of a segment DP and player's profile data including the height of the player and parameters of a standard proportions. An apex A' is an intersection of the visual line EP with an imaginary ground surface. Also, an apex B' is an intersection of a vertical line extending from the putter 1.

Supporting that an angle formed by an intersection of the imaginary ground surface with the visual line EP is α, Length AB≈ Height of eye (E)×(TAN θ+1/TAN (α+θ))−Arm Length CD When the green has no angle (i.e., θ=0), Putter Scale DP=K1L×K2L/(AB+K2L)

Where, L: the length of the player; K1 is the height of the eye level defined in the standard proportions; K2 is the arm length of the player defined in the standard proportions.

Figure 2:
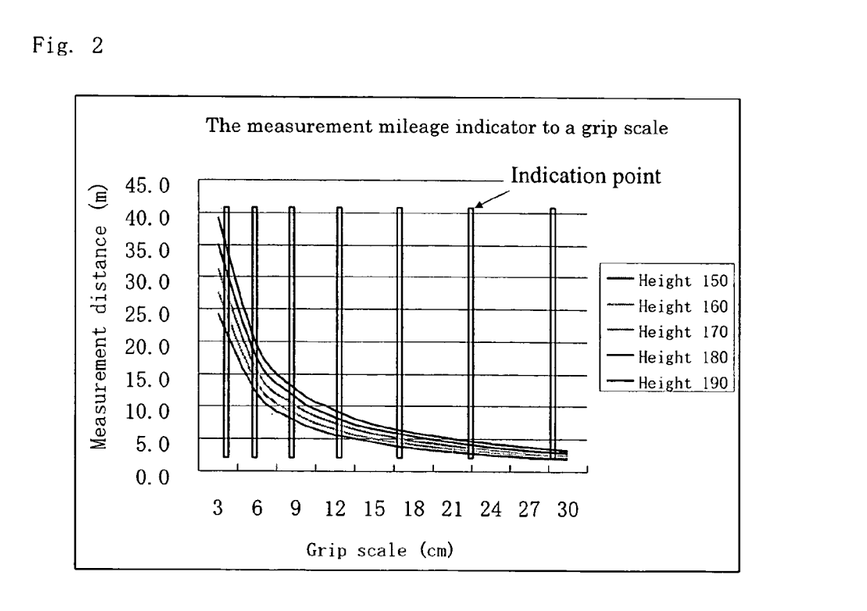
FIG. 2 is a graph showing relationships between a scale on the grip end and a distance to a cup for each height based on the standard proportions.

FIG. 2 is a graph showing relationships between the scale disposed on the grip and the distance to the cup A for each height based on the standard proportions. As is apparent from FIG. 2, the scale needs at least 32.5 centimeters (cm) in length from center D of a through-hole when a player 190 cm tall measures the putting distance of 3 meters (m). Further, Referring to, for example, a player 170 cm tall, the curved line on the graph can be drawn with collinear approximation by selecting at least seven points (e.g., 4, 6, 9, 12, 17, 22, and 28 cm from a center D of a through-hole).

Figure 3:
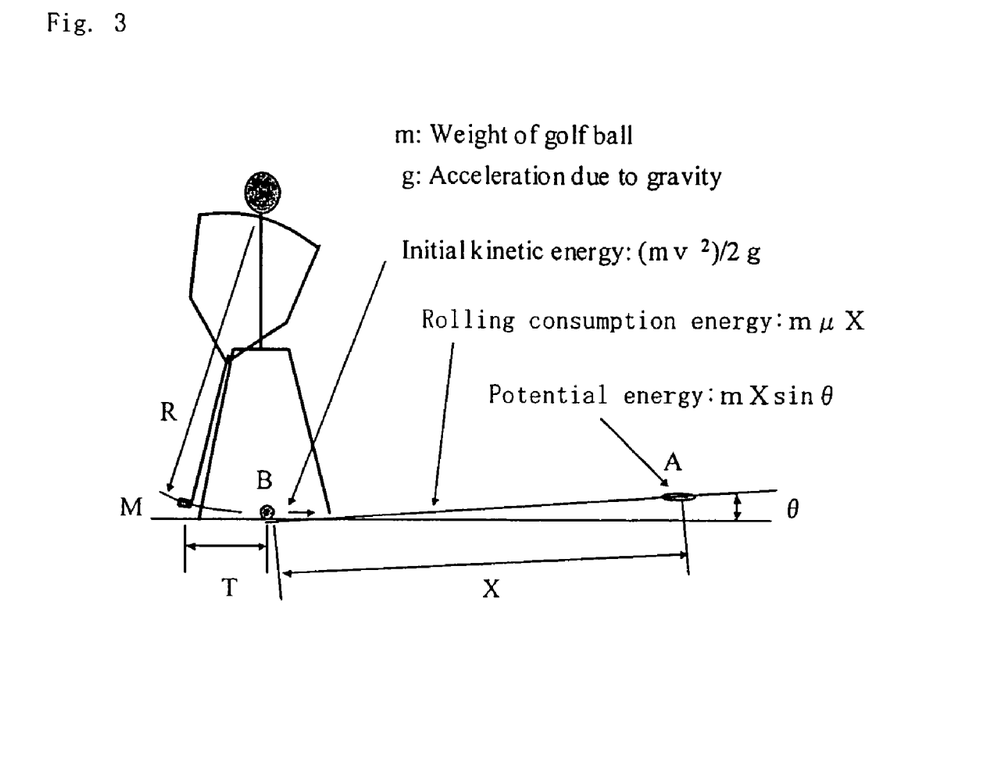
FIG. 3 is a diagram of putting a ball on the green.

FIG. 3 shows a frame format of putting a ball on a green. In FIG. 3, the player's putting motion can be modeled as a "pendulum" integrating the player's arms with the putter 1. Thus, part of potential energy of the pendulum by a backswing disappears in rolling of the ball putted.

Given that equivalent weight of the putter head is M, a length of the pendulum is R, and a backswing amount T, and supposing that the potential energy of the putter 1 can be converted into kinetic energy without any loss at the moment of hitting the ball B;

$MV^2/2\ g=MR(1-\cos\beta)$ where V: Putter head speed;

β: Backswing angle of the putter (where sin β=T/R).

At the moment of contact with the ball B, from the law of conservation of momentum;

$MV=(1-K_3)MV+mv+\epsilon$ where m: ball weight;

v: ball initial velocity;

$K_3$: momentum transmissibility between the putter and the ball; and

ϵ: momentum based on energy loss caused by non-linear distortion of the ball.

$mv≈K_3MV$ (ϵ can be negligible because of being nearly equal to 0)

Supposing that the ball B given initial velocity v rolls only X on the green having an inclination angle θ;

$mv^2/2\ g=m\mu X+mX\sin\theta$ where μ: rolling resistance coefficient on the green.

Figure 4:
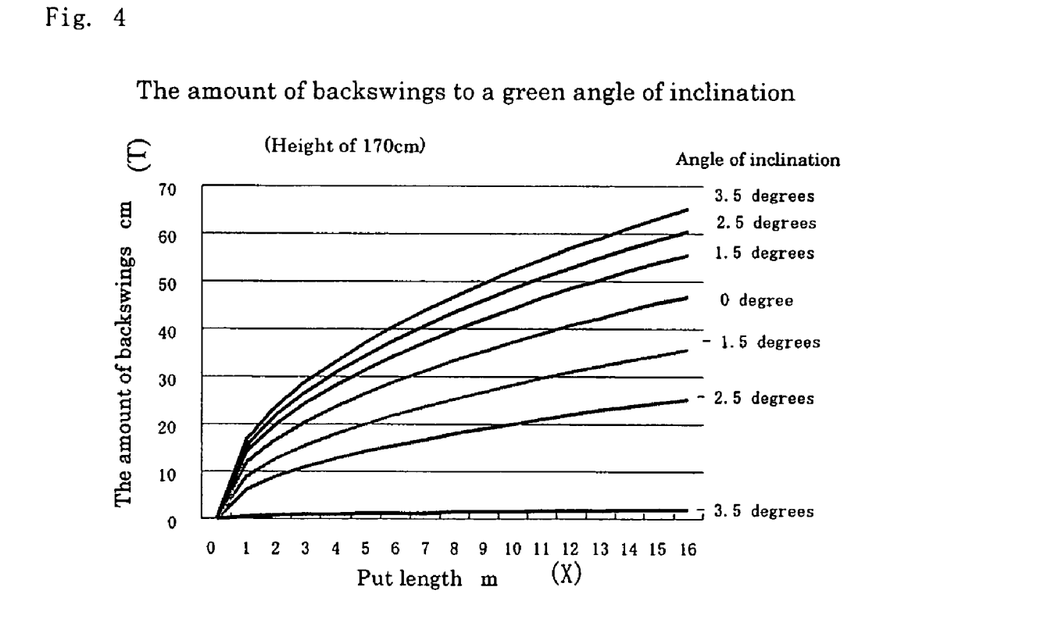
FIG. 4 shows a relationship between a putting distance X in the inclination angle θ of the green and the backswing amount T.

In view of the above formulas, FIG. 4 shows a relationship between a putting distance X in the inclination angle θ of the green and a backswing amount T.

In an inclination angle θ=0 degree, Table 1 shows a relationship of a putting distance X to each mark with the scale disposed on a grip, and Table 2 shows a relationship of a recommended backswing amount T with the scale.

TABLE 1

Relationship of grip scale with putting distance X for each height

| height | grip scale: length from through-hole at grip end (cm) | | | | | | | |
|---|---|---|---|---|---|---|---|---|
| (cm) | 4 | 6 | 9 | 11 | 14 | 17 | 21 | 26 |
| 150 | 18.1 | 11.9 | 7.7 | 6.2 | 4.8 | 3.8 | 3 | 2.3 |
| 160 | 20.6 | 13.6 | 8.8 | 7.1 | 5.5 | 4.4 | 3.5 | 2.7 |
| 170 | 23.3 | 15.3 | 10 | 8.1 | 6.2 | 5 | 3.9 | 3.1 |
| 180 | 26.2 | 17.2 | 11.3 | 9.1 | 7 | 5.7 | 4.5 | 3.5 |
| 190 | 29.2 | 19.2 | 12.6 | 10.2 | 7.9 | 6.3 | 5 | 3.9 |

X unit: m

TABLE 2

Relationship of grip scale with recommended backswings amount T for each height

| height | grip scale: length from through-hole at grip end (cm) | | | | | | | |
|---|---|---|---|---|---|---|---|---|
| (cm) | 4 | 6 | 9 | 11 | 14 | 17 | 21 | 26 |
| 150 | 61 | 51 | 41 | 37 | 32 | 29 | 26 | 22 |
| 160 | 59 | 48 | 39 | 35 | 31 | 28 | 25 | 22 |
| 170 | 57 | 47 | 38 | 34 | 30 | 27 | 24 | 21 |
| 180 | 56 | 45 | 37 | 33 | 29 | 26 | 24 | 21 |
| 190 | 55 | 44 | 36 | 32 | 29 | 25 | 23 | 21 |

T unit: cm

Figure 5:
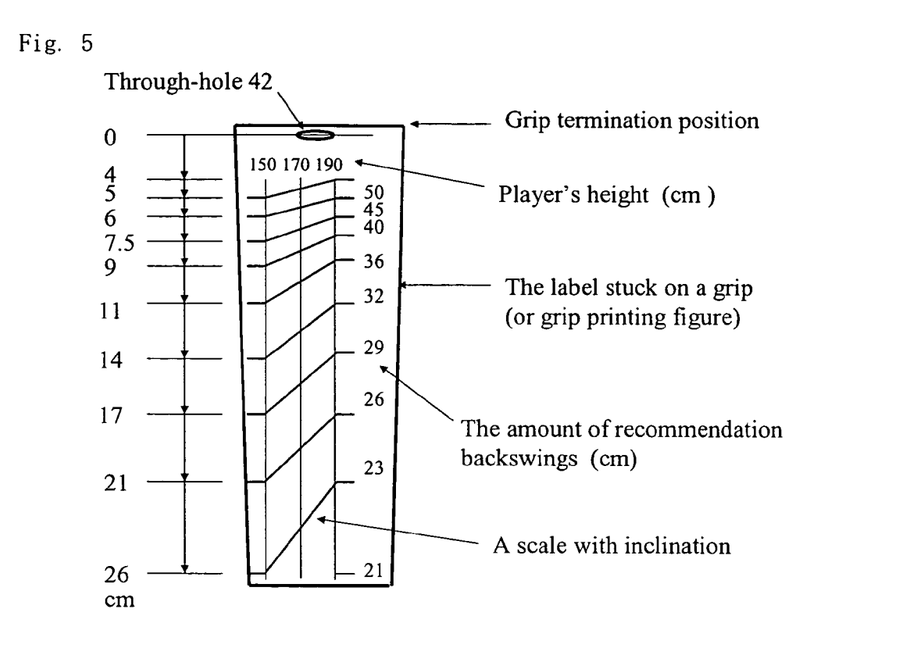
FIG. 5 shows a label disposed on a putter according to one embodiment of the invention.

As shown in Tables 1 and 2, the distances measured with the scale undergo significant changes in accordance with the heights, whereas the backswing amounts undergo small changes. By using these facts, as shown in FIG. 5, the relationships in reference with the recommended backswing amounts can be consolidated into only one label, covering almost every height.

A method of a putter swinging based on the recommended backswing amount will be discussed below. At the outset, the player stands with the player's feet shoulder-width apart and with the legs bent slightly, thereby locking part of the lower body, so that the player's eyes are located immediately above the ball B. Checking that the putter head is supposed to hit the ball perpendicularly, the grip is grasped evenly with the left hand, touched with the right hand. Then, the player bends the arms to form predetermined elbow angles, bring the putter head a little off the green not to be contact with the green. Further, considering that the spine is regarded as an axis of rotation of the pendulum, the player begins to backswing with twisting the upper body, keeping a position of the head, an angle of the wrists, and the elbow angles. Where the putter head comes to the recommended backswing amount, the player starts the downswing, loosing up and sharpening feeling in the hands. In a process of the downswing, the player should rotate the upper body integrated with the shoulder and the arms so as not to feel changes in weight of the putter 1, and make the follow-through as the same amount as the backswing, swinging the putter 1 like a pendulum. The player should putt the ball B accurately because a distance that the ball runs decreases and the direction is out of the putting line if the ball B does not come into contact with a sweet spot of the putter 1. In addition, the spread of the player's legs should be the shoulder-width. Thus, the player takes the recommended backswing amount in reference to end part of shoes (i.e., a half of the shoulder-width).

A measurement method according to an embodiment of the present invention may be defined with reference to at least the following condition: the inclination angle of the green is 0 degrees. It is understood that the fact that an actual green inclines affects a result of the measurement. Referring back to FIG. 1, supposing that the inclination angle of the green is θ, the player looks to the cup A, suspending the putter 1, and the player reads off the scale disposed on the grip. It is noted that a read-off value corresponds to the condition: the inclination angle=0 degrees. This means the distance F to the imaginary cup A'. Where the player is 170 cm tall, Table 3 shows factors of the distances F for predetermined inclination angles to actual distances X. If the inclination angle of the green is approximately an angle of 3.5 degrees or more, the ball could not stop. Thus, the range of the inclination angle of the green is shown within an angle of ±3.3 degrees.

TABLE 3

Height: 170 cm

| actual length | Inclination angles of the green and factors | | | | | | |
|---|---|---|---|---|---|---|---|
| (X m) | 3.3° | 2.5° | 1.5° | 0° | −1.5° | −2.5° | −3.3° |
| 5 | 1.24 | 1.18 | 1.11 | 1 | 0.90 | 0.83 | 0.77 |
| 10 | 1.42 | 1.32 | 1.19 | 1 | 0.81 | 0.69 | 0.59 |
| 15 | 1.61 | 1.46 | 1.27 | 1 | 0.73 | 0.55 | 0.41 |
| 20 | 1.80 | 1.60 | 1.36 | 1 | 0.65 | 0.42 | 0.23 |

As shown in Table 3, if, for example, the green inclines upward at an angle of 3.3 degrees, an actual distance X of 5 meters is converted as follows: a measured distance F =5×1.25=6.2 meters. Namely, in uphill putting, a measured distance F is made longer than an actual distance X. On the other hand, in downhill putting, a measured distance F is made shorter than that.

In contrast to this, as shown in FIG. 4, a relationship between a putting distance X and a backswing amount T depends on the inclination angle of the green. Table 4 shows, where the player is 170 cm tall, factors of backswing amounts T to the inclination angles of the green.

TABLE 4

Relationship between inclination angles and backswing amounts
Height 170 cm

| | Inclination angle of Green | | | | | | |
|---|---|---|---|---|---|---|---|
| | 3.3° | 2.5° | 1.5° | 0° | −1.5° | −2.5° | −3.3° |
| Factor | 1.4 | 1.3 | 1.2 | 1.0 | 0.8 | 0.5 | 0.3 |

A correction factor of the backswing amount to the measurement value F in a maximum inclination ±3.3 degrees, on which the ball can stably stop, is defined as follows. Specifically, the correction factor of the backswing amount is defined by multiplying the factor as shown in Table 3 by the correction factor as shown in Table 4. The distance on a virtual plane and the recommended amount of the backswing are indicated on the grip scale. Also, the correction factor at the angle of 3.3 degrees as shown in Table 5 may be indicated on the grip scale for reference. In practice use, the player can retrieve a correction factor between 0.3 times and 1.2 times based on the backswing amount on the grip scale.

TABLE 5

Insignia disposed on a putter grip
Height 170 cm

| | Scale [cm] | | | | |
|---|---|---|---|---|---|
| | 4 | 5 | 6 | 7.6 | 9 |
| Measurement distance [m] | 23.3 | 18.0 | 15.3 | 12.0 | 10.0 |
| Backswing [cm] | 57 | 50 | 47 | 41 | 38 |
| Correction ratio for +3.3° | ×0.8 | ×0.85 | ×0.9 | ←×1.0 → | |
| Correction ratio for −3.3° | ×1.0~ | ×0.8 | ×0.6 | ←×0.5 → | |

| | Scale [cm] | | | | |
|---|---|---|---|---|---|
| | 11 | 14.5 | 17 | 21 | 26 |
| Measurement distance [m] | 8.1 | 6.0 | 5.0 | 3.9 | 3.1 |
| Backswing [cm] | 34 | 29 | 27 | 24 | 21 |
| Correction ratio for +3.3° | ←×1.1 → | | ←×1.2 → | | |
| Correction ratio for −3.3° | ←×0.4 → | | | ←×0.3 → | |

As shown in Table 5, when a putting distance is 15 meters or less, the backswing amount in uphill putting multiplies by a factor of 1.1. If there is a large downhill inclination (e.g., approximately θ=−3 degrees) and the player is willing to accept 2 strokes, the backswing amount is half of the backswing amount at θ=0 degrees for a distance to the cup of 15 meters or below, and the backswing amount is multiplied by 0.8 for the distance to the cup of above 15 meters. Alternatively, the player may roughly determine a position of the cup multiplying the distance to the cup by the correction factor, and estimate a backswing amount.

Figure 6:
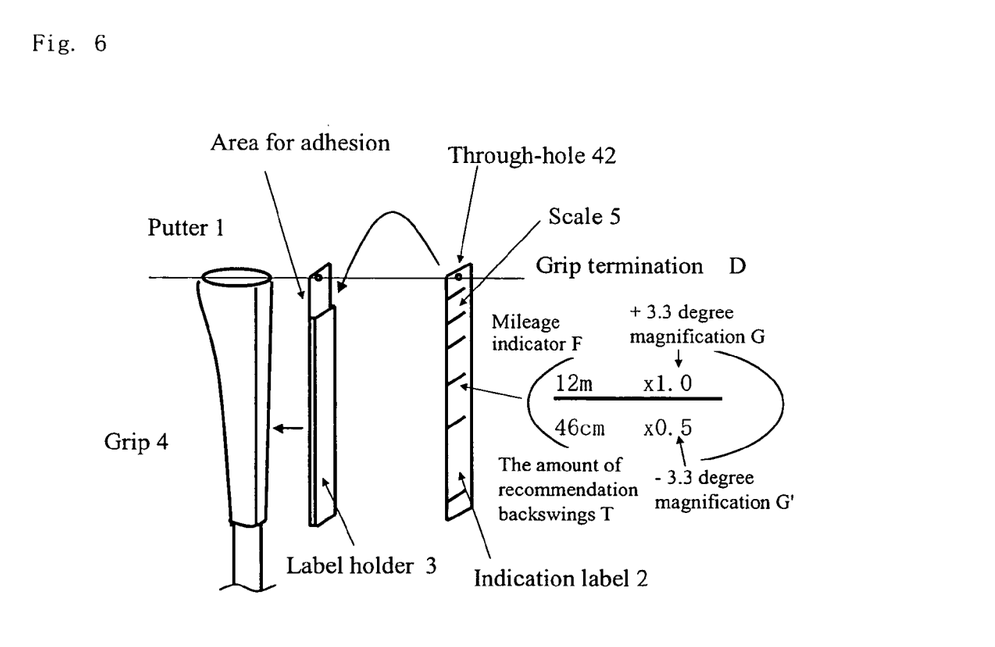
FIG. 6 shows a putter according to one embodiment according of the invention.

FIG. 6 shows a putter 1 of an exemplary embodiment according to the present invention. Referring to FIG. 6, the putter grip 4 includes a label holder 3 holding a indication label 2. The indication label 2 may be made of moisture-resistant material. The label holder 3 may be attached to the putter grip 4 by the player. The indication label 2 is marked with a scale on the basis of the through-hole 42 at the grip end D, and indicates the recommended backswing amount T at the inclination angle 0 degree for respective marks. Also, the indication label 2 indicates the distance F to the cup at the inclination angle 0 degree as a reference value. Further, the indication label 2 may indicate the scale factors G of uphill putting at 3.3 degrees and downhill putting at 3.3 degrees as reference values, allowing the player to easily judge in circumstances. Because the indications of the indication label 2 depend on the height, for example, the marks are provided 5 cm apart between 150 cm and 190 cm of the height. The player selects one of the indication labels, which is the closest indication to his/her height. The indication label 2 can be detached from the label holder. The backside surface of the label 2 serves as a straight ruler in centimeters, and thereby the player may use it to measure the backswing amount T in practice putting.

Figure 7:
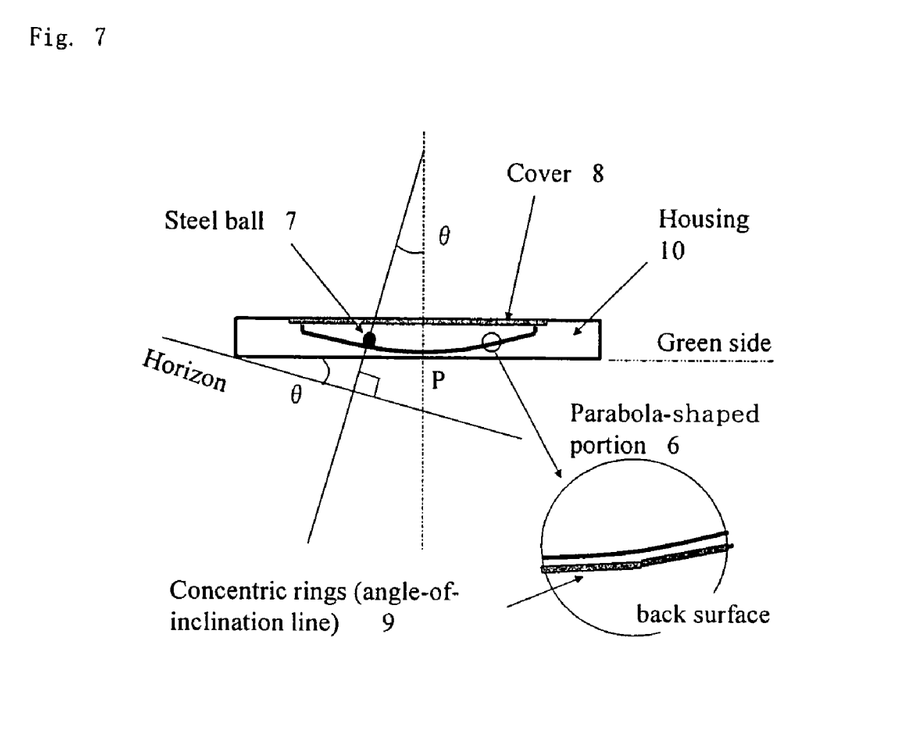
FIG. 7 shows an inclination angle sensor of a putter according to one embodiment according of the invention.

A method of measuring an inclination angle of the green with accuracy will be discussed with reference to FIG. 7. The housing 10 has an enclosed space formed by a parabola-shaped portion 6 and a cover 8, which are made of transparent material. The housing 10 accommodates a steel ball 7 so as to freely roll therein. A plurality of concentric rings 9 is arranged on a back surface of the portion 6, centering around the deepest part. It is preferred that the rings 9 are distinguished by using different colors. The player can measure the inclination angle of the green based on the relatively positional relationship between the steel ball 7 and the rings 9. The maximum angle at which the golf ball can stop on the green is approximately 3.5 degrees. Thus, it is preferred that an angular range of the parabola portion 6 is more than 4.5 degrees, taking into account of the diameter of the steel ball 7.

Figure 8:
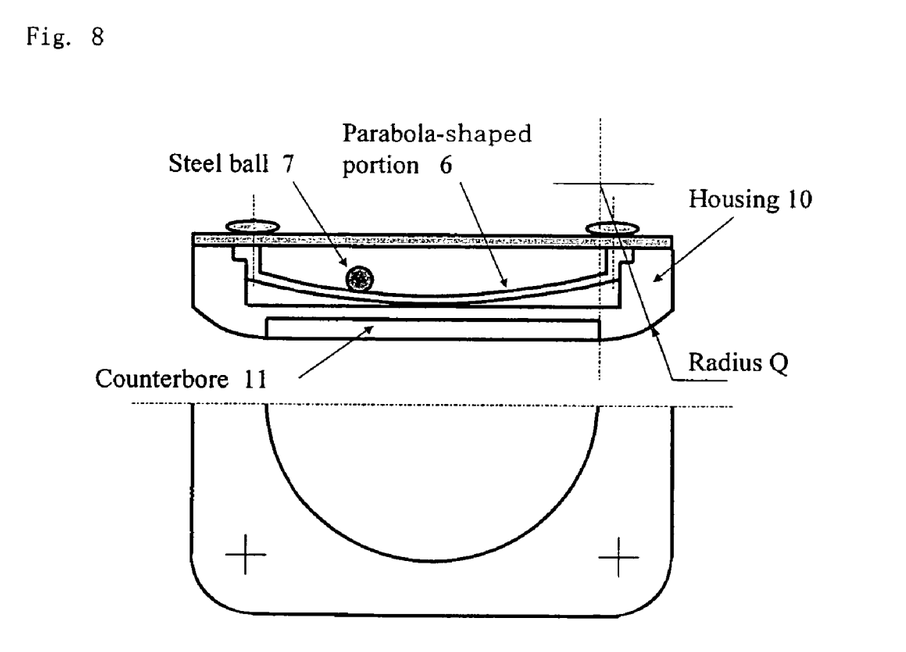
FIG. 8 shows an inclination angle sensor of a putter according to one embodiment according of the invention.
Figure 9:
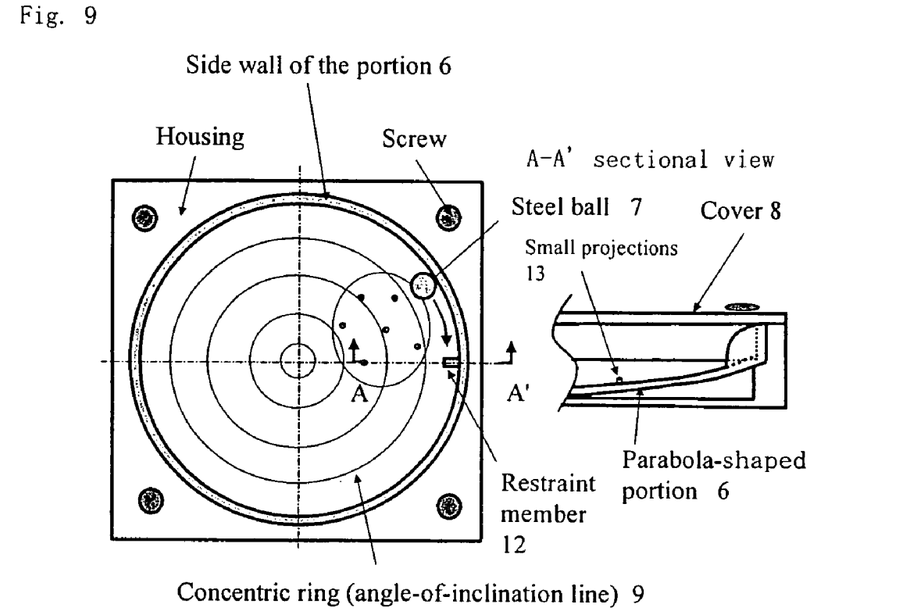
FIG. 9 shows an inclination angle sensor of a putter according to one embodiment according of the invention.

The inclination angle sensor as discussed above may be used independently. In this case, the housing 10 may include a counterbore or recess 11 formed in a circular shape disposed on the bottom surface thereof as shown in FIG. 8 so that the measuring result is unswayed by the state of the green clipped. In addition, a bottom edge portion of the housing 10 may be rounded or chamfered to extend from an opening of the counterbore 11. It is preferred that the edge portion may be the same radius of the golf ball B. Further, in order to shorten convergence time of movement of the steel ball 7, as shown in FIG. 9, a restraint member 12 is disposed on a side wall of the portion 6 to restrain the movement of the steel ball 7 rolling along the wall. Alternatively, a plurality of small projections are disposed on the entire bottom surface of the parabola portion 6 to cause energy of the movement of the steel ball 7 to be absent. The size and shape of projections are selected so as not to cause some measurement error. It is noted that the projection spacing is assured so that the steel ball 7 can pass therebetween without contact.

Figure 10:
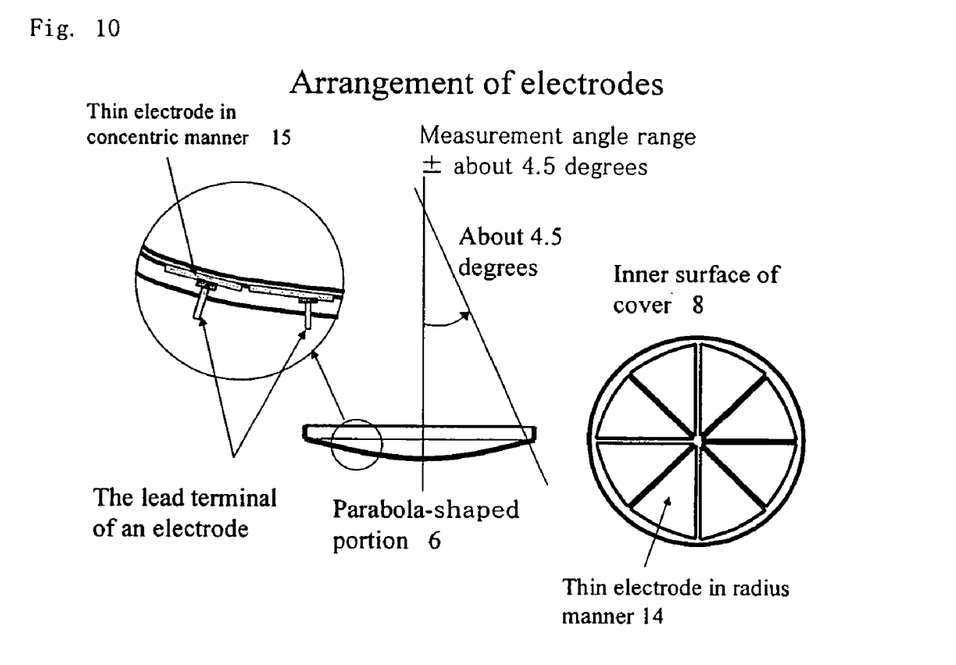
FIG. 10 shows a sensor of a putter according to one embodiment according of the invention.
Figure 11:
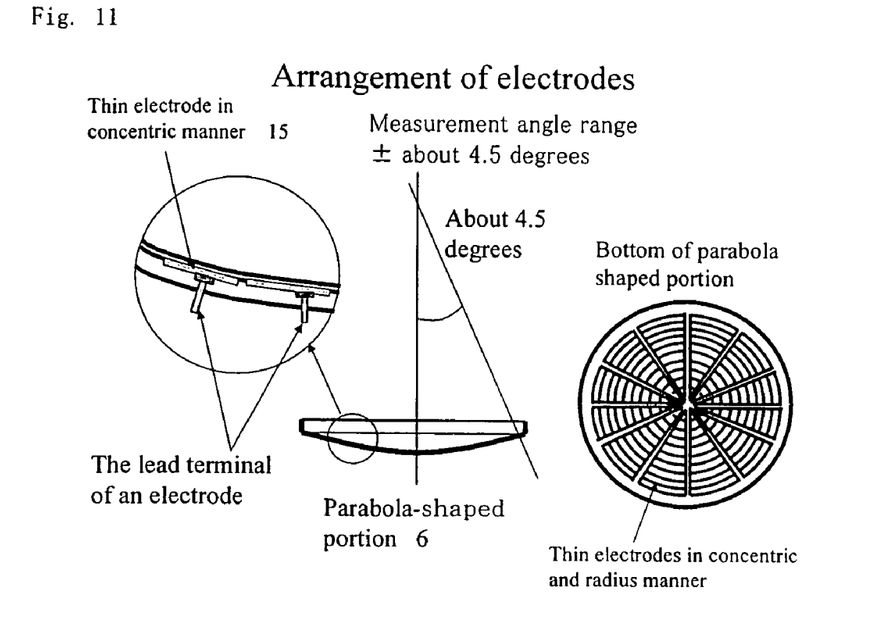
FIG. 11 shows a sensor of a putter according to one embodiment according of the invention.

FIGS. 10 and 11 show a sensor that electrically detects the inclination angle of the green. A structure that the steel ball 7 freely rolls in the housing 10 is the same as, or equivalent to, the above embodiment. In this embodiment, a position of the steel ball 7 is detected based on change of capacitance between two electrodes. For example, as shown in FIG. 10, a plurality of thin electrodes 14 are disposed on an inner surface of the cover 8 in a radial manner, and a plurality of thin electrodes 15 are disposed on the bottom surface of the parabola portion 6 in concentric manner centering around the deepest part thereof. Alternating current is applied to one of the electrodes 14 and one of the electrodes 15. Thus, the position of the steel ball 7 can be detected based on steep change of the current. A direction of the inclination angle of the green is detected based on which electrode 14 is selected. The inclination angle is detected based on which electrode 15 is selected.

Alternatively, as shown in FIG. 11, a plurality of electrodes are disposed on the bottom surface of the parabola portion 6 in concentric and radius manner. A position of the steel ball 7 can be detected by applying in turn current between adjacent within a group of electrodes in a direction of a same radius. Detecting the direction by a group of electrodes arranged in radius manner and detecting the angle by one of electrodes arranged in concentric manner are the same as, or equivalent to, the above-mentioned method.

In order to shorten time of reading the inclination angle, as mentioned above, the restraint member may be employed. Alternatively, in electrically detecting the position of the steel ball 7, the positions of the steel ball 7 that damps out oscillations may be recorded in time series, and the direction and the angle can be identified by estimating a middle position between the peak magnitudes as a convergence position.

Figure 12:
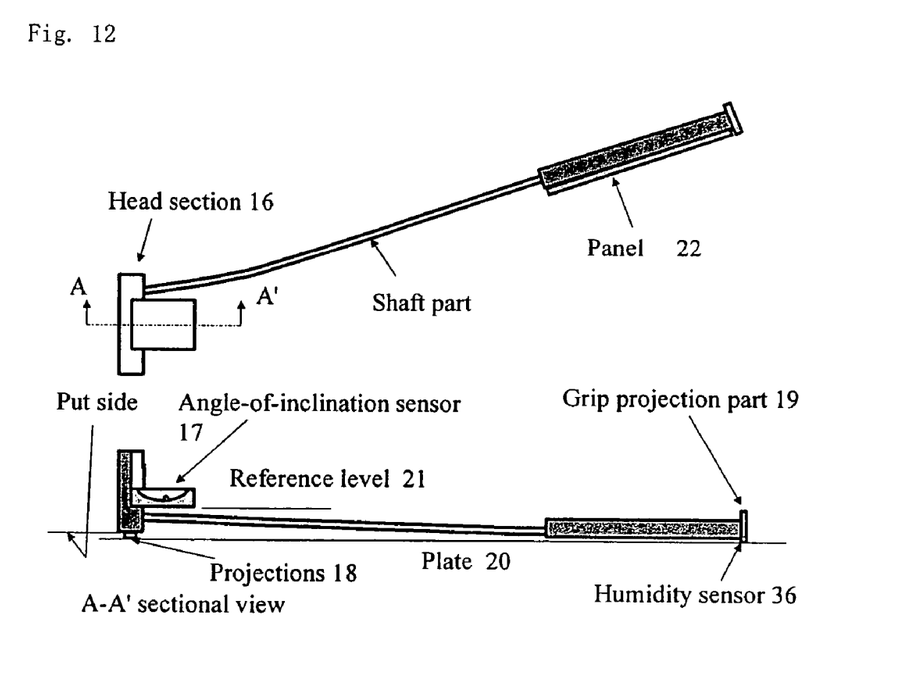
FIG. 12 shows a putter attaching an inclination angle sensor therein according to one embodiment according of the invention.

FIG. 12 shows a putter having an inclination angle sensor disposed in a putter head 16. As shown in FIG. 12, projections 18 each disposed on both ends of the putter head 16. When the putter 1 lies down keeping the surface side down, a plate 20 composed of a shaft or grip projection 19 is parallel to a reference level 21 of the sensor 17 of the putter head 16. The player may estimate the distance to the cup, reading off an angle from the sensor 17 and multiplying the labeled distance and/or the recommended backswing amount by the correction factors. Otherwise, a microcomputer may correct the distance and/or the recommended backswing amount by manually or automatically inputting the angle read out from the sensor.

The electronic measurement system is required to automatically correct data. As mentioned above, the distance to the cup is measured by way of suspending the putter 1. An intersection of the visual line to the cup and the grip 4 is detected using an indication of an LED arrayed in series in a longitudinal direction of the grip 4. The electronic measurement system will be discussed in detail with reference to FIG. 13.

Figure 13:
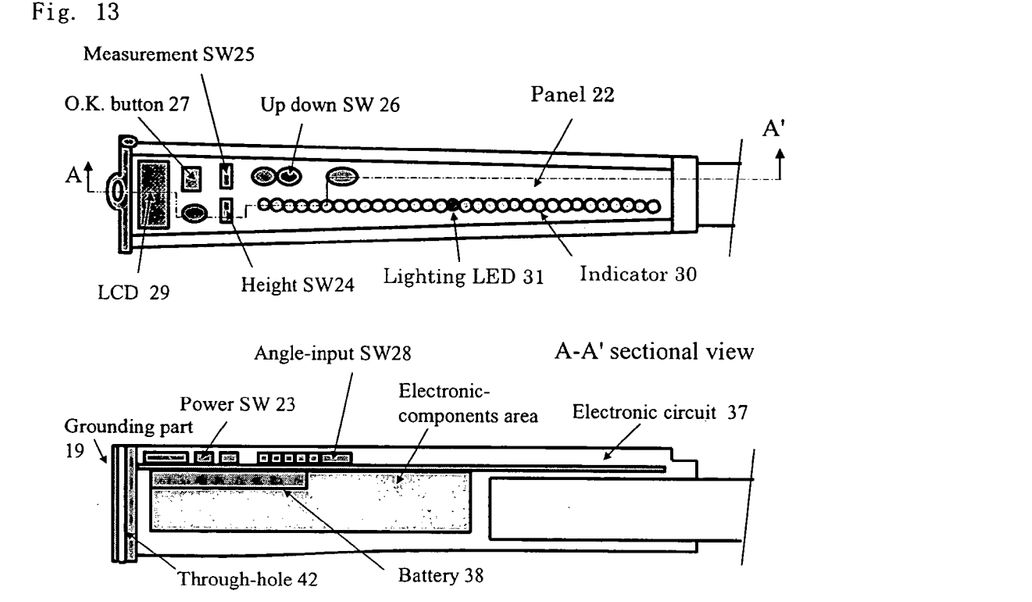
FIG. 13 shows a grip portion of a putter according to one embodiment according of the invention.

An operation panel 22 disposed on the grip 4 includes a power switch 23, a height switch 24, a measurement switch 25, an up-down switch 26, an OK button switch 27, an angle-input switch 28, an LCD 29, and an indicator 30 comprising a plurality of LED. The operation panel 22 may be configured by membrane switches, resulting in drip-proofness. The display 29 prompts the player to input some parameters such as "height" and "angle," and also provide information regarding "an inclination angle of the green," "a distance to the cup," and "a recommended backswing amount." In an identification process, the player presses the measurement switch 25, suspending the putter 1, to identify the intersection of the visual line and the grip 4, and thereafter the player presses the up-down switch 26 to cause one of the LEDs to be lit up in turn. The player presses the OK button switch 27 at the time the LED 31 on the visual line is turned on. In doing so, the measured distance to the cup and the recommended backswing amount can be displayed on the LCD 29.

After that, the player lays the putter 1 down on the green so as to align the putter with a line connecting the cup A and the ball B and be located to rearward of the ball B. Then, the player presses the angle-input switch 28 to obtain the inclination angle of the green. Further, the player presses the OK button 27. Thus, the measured distance is converted to an effective distance, the recommended backswing amount is calculated based on the effective distance and the inclination angle, and then the information are displayed. If the putter 1 does not include such a mechanism of electrically detecting the inclination angle, the player visually estimates the inclination angle based on a positional relationship between the rings 9 of the sensor and the steel ball 7 at rest, inputs the estimated angle using the up-down switch 26, and presses the OK button switch 27.

Figure 14:
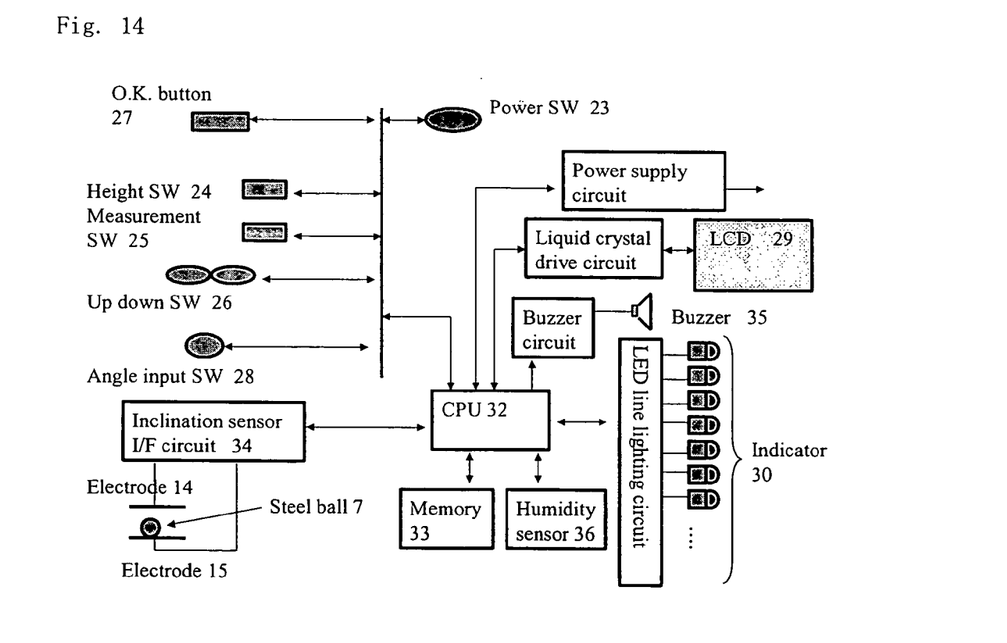
FIG. 14 is a block diagram illustrating a circuit of the system according to one embodiment of the invention.

FIG. 14 is a block diagram illustrating a circuit of the system according to an embodiment of the invention. The embodiment will be described in detail below with reference to FIG. 14. A CPU 32 enters an operation mode when the power switch 23 is turned on, and thereby the system waits for key-in with either the height switch 24 or the measurement switch 25. When the height switch 24 is operated, the system allows current height data read from the memory 33 to be displayed on the LCD 29. Thus, the player can interactively input height data to either increase or degrease intended height by 1 cm with the up-down switch 26. The player presses the OK button switch 27 when the indication of the height comes to the intended height, and thereby the height data in the memory 33 is updated.

When the measurement switch 25 is turned on, the CPU 32 reads out the height data from the memory 33, and allows one of the LEDs of the indicator 30 which is associated with last input to be turned on. Then, when the up-down switch 26 is pressed, the CPU 32 allows one of the LEDs each to be turned on in turn upward or downward. In this situation, when the OK button switch 27 is pressed, the CPU 32 calculates the distance to the cup and the recommended backswing amount based on the height, and outputs the calculated data to the LCD 29.

After that, the putter 1 with the system is laid on the green as the measurement operation, and the angle-input switch 28 is pressed. The CPU 32 detects the position of the steel ball 7 accommodated in the sensor 17 using the electrodes 14 and 15 via an interface circuit 34. The CPU 32 calculates the inclination angle based on the detected positioning data, and thereafter the indicator 30 is turned on to inform the player of completion of the measurement. Alternatively, the CPU 32 allows some indication to be displayed on the LCD 29, sounding a beep.

In addition, the CPU 32 may estimate the position of the steel ball 7 at rest during the movement of the steel ball 7 in a manner of recording successive positions as mentioned above. When the measurement is completed, the inclination angle is determined. When the OK button switch 27 is pressed, the instant measured distance is converted to the effective distance on the inclination angle, and blinked on the LCD 29. Further, the recommended backswing amount is re-calculated based on the effective distance and the inclination angle, and blinked on the LCD 29. In this case, if the latest measured distance does not exist, only the angle is displayed.

Further, when a humidity sensor 36 disposed in the projection 19 of the grip detects a droplet, the CPU 32 further corrects the recommended backswing amount which is corrected in accordance with the inclination angle of the green based on an increasing amount of rolling resistance due to the green wet from rain. Thus, the CPU 32 allows the further corrected backswing amount together with indication of raindrops to be displayed on the LCD 29

Figure 15:
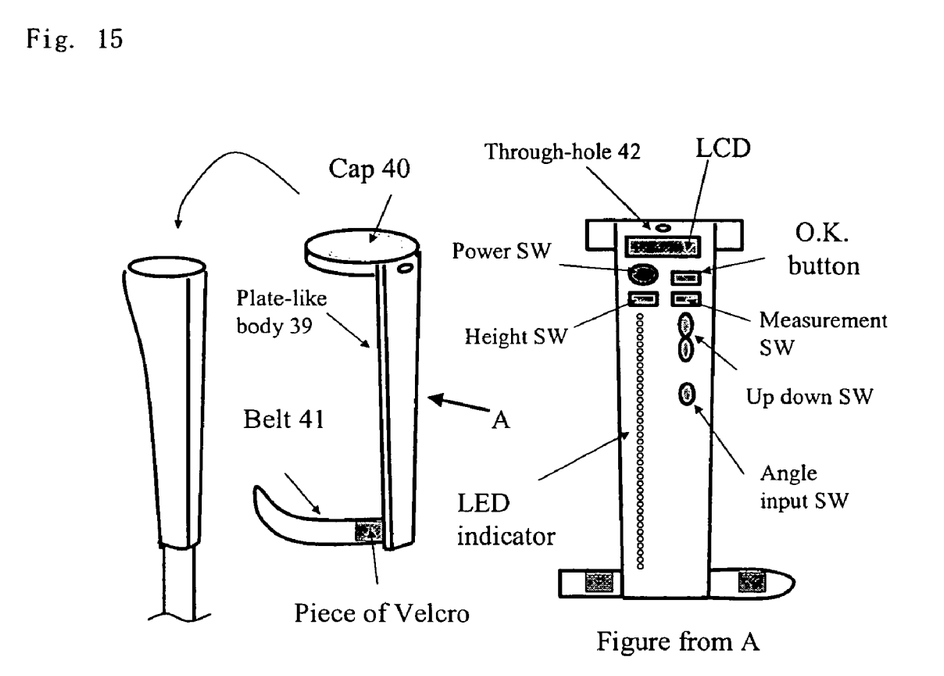
FIG. 15 shows a measurement unit for mounting a putter according to one embodiment of the invention.

FIG. 15 shows a measurement unit for mounting a putter according to one embodiment of the invention. As shown in FIG. 15, the measurement unit includes a plate-like body 39 having a control panel 22, an electronic circuit 37, and battery 38. A cap 40 which doubles as a stopper is disposed on one end of the measurement unit. The cap 40 is used for positioning. A belt 41 is disposed on the opposite end of the measurement unit. The belt 41 allows the measurement unit to be fixed on the grip or shaft of the putter.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A putter comprising:
   a shaft;
   a head disposed on an end of the shaft; and
   a grip disposed on an opposite end of the shaft, wherein the grip comprises:
   a through-hole formed on an end of the grip, and
   an indication member having a scale for determining a distance to a cup and a recommended backswing amount extending from the through-hole to where the grip meets the shaft.

2. The putter according to claim 1, wherein the scale comprises marks indicating at least one of a distance to a cup and a recommended backswing amount.

3. The putter according to claim 1, wherein the putter further comprises a holder configured to hold the indication member and be detachable from the grip.

4. The putter according to claim 1, wherein the through-hole formed on an end of the grip in a direction parallel to a plane of the striking surface of the head.

5. A putter comprising:
   a shaft;
   a head disposed on an end of the shaft; and
   a grip disposed on an opposite end of the shaft, wherein the grip comprises:
   a through-hole formed on an end of the grip, and
   an indication member having a scale extending from the through-hole toward the shaft,
   wherein the grip comprises a display unit disposed on a surface thereof, an operation panel disposed on the surface thereof, and a control circuit disposed therein, wherein the scale is composed of a plurality of light-emitting diodes arranged in a line, and wherein the control circuit controls the plurality of light-emitting diodes to indicate in turn and, based on an input from the operation panel, calculates a distance to a cup and a recommended backswing amount and controls the display unit to display the calculated distance and the amount.

6. The putter according to claim 5, further comprising a humidity sensor disposed on the grip, wherein the control circuit correct the recommended backswing amount.

7. A putter comprising:
   a shaft;
   a head disposed on an end of the shaft; and
   a grip disposed on an opposite end of the shaft, wherein the grip comprises:
   a through-hole formed on an end of the grip, and
   an indication member having a scale extending from the through-hole toward the shaft,
   wherein a first protrusion is disposed at both ends of an putting surface of the head and a second protrusion is disposed on the grip, and wherein the putter further comprises an inclination angle sensor disposed on the head such that the inclination angle sensor lies in a horizontal position when the first protrusion and the second protrusion are on the ground.

8. The putter according to claim 7, wherein the inclination angle sensor comprises a housing having an enclosed space formed by a parabola-shaped portion and a cover, a ball which freely rolls within the parabola-shaped portion, and a restraint member disposed on an inner wall of the parabola-shaped portion and configured to restrain movement of the ball.

9. The putter according to claim 8, wherein the parabola-shaped portion and the cover are formed by translucent material, and an bottom surface of the parabola-shaped portion has rings configured in concentric manner centering around the deepest part thereof.

10. The putter according to claim 8, wherein the inclination angle sensor comprises:
   a parabola-shaped portion having a cover;
   a ball which freely rolls within the parabola-shaped portion;
   a plurality of first electrodes disposed on the bottom surface of the parabola-shaped portion; and
   a control circuit operatively connected to the plurality of electrodes, wherein the control circuit configured to specify positions of the ball in time series based on a relationship between at least one of the plurality of electrodes and the ball which rolls, estimate a ball stop position and an inclination direction based the time-series positions, and output the estimated position and the direction.

11. The putter according to claim 10, wherein a plurality of first electrodes are arranged in concentric manner centering around the deepest part of the parabola-shaped portion and wherein the inclination angle sensor comprises a plurality of second electrodes disposed on an inner surface of the cover and arranged in radius manner.

12. The putter according to claim 10, wherein the plurality of first electrodes are arranged in concentric manner centering around the deepest part of the parabola-shaped portion and separated in a radial pattern.

* * * * *